United States Patent Office 3,366,662
Patented Jan. 30, 1968

3,366,662
PROCESS FOR PREPARING ISOCYANATES
Ehrenfried H. Kober, Hamden, and Eric Smith, New Haven, Conn., assignors to Olin Mathieson Chemical Corporation, a corporation of Virginia
No Drawing. Filed Mar. 2, 1964, Ser. No. 348,799
5 Claims. (Cl. 260—453)

ABSTRACT OF THE DISCLOSURE

A process for the preparation of isocyanates which comprises reacting diphenyl carbonate with an amine.

---

This invention relates to novel isocyanates and to a method for their preparation. More particularly this invention relates to the preparation of novel isocyanates by reaction of an aliphatic primary monoamine, an aromatic primary monoamine or a long chain aliphatic diamine with diphenyl carbonate.

Isocyanates, such as 2,4-tolylene diisocyanate, are prepared today in large quantities. In the industrial process utilized widely, phosgene is reacted with an amine yielding the corresponding isocyanate and hydrogen chloride. Such processes suffer from major disadvantages in that the phosgene employed is poisonous and extremely hazardous to handle and in handling the hydrogen chloride formed, which is a very corrosive material, special materials of construction must be employed. Additionally, the hydrogen chloride formed is a by-product which brings a very low price, if it can be sold at all, otherwise it must be disposed of by neutralization or by other methods at added cost.

In the process of this invention in which diphenyl carbonate is reacted with an amine or diamine to form the corresponding mono- or bifunctional isocyanate, the by-product of the reaction is not hydrogen chloride but phenol which not only is less corrosive but also brings a considerably higher price in the chemical market. A further advantage is that the formation of chlorine-containing by-products, such as the $\omega$-chlorohexyl isocyanates formed when aliphatic diamines, e.g. hexamethylene diamine, are phosgenated, which must be removed from the desired isocyanate by careful purification techniques, is avoided completely in the novel process of this invention.

The process of this invention can be represented by the following equation where for purposes of illustration, the reaction of an aliphatic primary monoamine is shown:

$$R-NH_2 + CO(OC_6H_5)_2 \longrightarrow RNHCOOC_6H_5 + C_6H_5OH$$
$$\downarrow\uparrow$$
$$R-NCO + C_6H_5OH$$

wherein R is an alkyl group of from 1 to 10 carbon atoms. In the process of this invention aromatic primary monoamines of the formula:

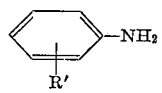

wherein R' is selected from the group consisting of hydrogen or alkyl of from 1 to 5 carbon atoms and aliphatic diamines of the formula:

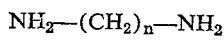

wherein $n$ is an integer of from 4 to 10, can also be employed.

The time of the reaction can be varied widely from about 0.1 to about 2 hours or more and preferably will be from about 0.1 to about 0.5 hour. The process of this invention can be conveniently carried out at atmospheric pressure, although subatmospheric pressures can be utilized, if desired. The isocyanate product prepared in the novel process of this invention can be recovered from the reaction mixture by distillation techniques employed under vacuum conditions. Other recovery methods, such as extraction, are also suitable.

The reaction can be conveniently carried out, for example, adding the amine reactant to molten diphenyl carbonate at a temperature of from about 50° C. to about 350° C. Preferably, the reaction temperature will range from about 60° C. to 250° C. Although amine reactants which are solid at room temperature can be added as such to the molten diphenyl carbonate, these amines can also be added molten to the diphenyl carbonate. While the reaction can be carried out with stoichiometric quantities of the reactants preferably an excess of the diphenyl carbonate of from about 0.1 to 20 moles per mole of amine utilized in the reaction can be employed. Aromatic amines useful as starting materials in the process of this invention include for example, aniline, o-, m- and p-toluidine, 2-ethyl aniline, 3-isopropyl aniline, 2-n-butyl aniline, etc. Suitable aliphatic monoamines include ethylamine, n-propylamine, isopropylamine, tert.-butylamine, hexylamine, 2-ethyl hexylamine, 3-methyl-heptylamine, etc. Useful aliphatic diamines include, n-butylene, amylene, hexylene, iso-octylene, n-octylene, nonylene, and n-decylene diamines, etc. Other suitable amines include o-, m-, and p-fluoroaniline, 2,4,6-trichloroaniline, 2,4,6-tribromoaniline, 2,3,5,6-tetrachloro-1,4-diaminophenylene, 5-chloro-2,4-tolylene diamine, etc.

Other organic carbonates which can be utilized in the process of this invention include, for example, bis(o-, m- or p-chlorophenyl)carbonate, bis(dichlorophenyl) carbonate, bis(trichlorophenyl) carbonate, bis(tetrachlorophenyl) carbonate, bis(pentachlorophenyl) carbonate, isomers and mixtures of these compounds and the corresponding bromine compounds.

The diisocyanate products prepared in the process of this invention can be reacted with polyols to form useful polyurethane products by methods well known in the art. The monoisocyanate products are useful in the manufacture of urethanes, ureas, and carbonates which find application as pharmaceuticals, fine chemicals, agricultural chemicals, etc.

This invention is illustrated in detail in the following examples which are to be considered not limitative.

EXAMPLE I

A 300 ml., 3-necked flask was fitted with mechanical stirrer, dropping funnel and thermometer, and heated by full immersion in an oil bath. For distillation, a very simple head was employed (no column) with thermometer, air-condenser, adapter and receiver, which was connected to an aspirator, needle valve and manometer assembly.

Diphenyl carbonate (107.0 g.; 0.5 g. mole) was charged to the flask and melted (78°) by heating. Hexamethylene diamine (5.8 g.; 0.05 g. mole) was melted and added dropwise, with stirring; a slight exotherm was noted, the temperature rising to 94° C. The distillation equipment was attached, 100 mm. Hg vacuum was applied and the flask was heated. Results of the distillation operation are set forth below:

| Fraction | Pot Temp. (° C.) | Head Temp. (° C.) | Weight of Distillate (g.) | Hexamethylene Diisocyanate | |
|---|---|---|---|---|---|
| | | | | Percent [3] | Weight (g.) |
| 1 | 176–204 | 143–171 | [1] 24.0 | 2.0 | 0.48 |
| 2 | 220–236 | 171–222 | 81.55 | 4.96 | 4.18 |
| Residue [2] | >260 | | 2.8 | 10.6 | |

[1] A 3.0 g. sample of pot contents was withdrawn between Fractions 1 and 2 by analysis was found to contain 2.80 percent by weight of hexamethylene diisocyanate.
[2] A brown oil containing 5.3 weight percent of —NCO.
[3] As determined by titration with dibutylamine.

The yield of product was 55.5 percent based on the hexamethylene diamine charged to the reactor. The pure diisocyanate product can be recovered by further distillation of the fractions indicated above.

EXAMPLE II

The apparatus was identical to that described in Example I. Diphenyl carbonate (107.0 g.; 0.50 g. mole) was melted (78° C.) and 2-ethylhexylamine (12.9 g.; 0.1 g. mole) was added with stirring (78–95° C.), causing a slight exotherm. The distillation assembly was set up and 100 mm. vacuum applied; the pot temperature was raised, but no distillation commenced until the temperature had reached 163° C. The results of the distillation procedure are set forth below:

| Fraction | Pot Temp. (° C.) | Head Temp. (° C.) | Pressure (mm. Hg) | Weight (g.) | 2-Ethylhexyl Isocyanate (percent by weight) [1] |
|---|---|---|---|---|---|
| 1 | 163–227 | 118–145 | 100 | 26.2 | 15.26 |
| Shut Down | | | | | |
| 2 | 171–180 | 71–175 | 13 | 41.8 | 1.35 |
| 3 | 180–210 | 173–185 | 13 | 44.17 | 0.78 |
| 4 | 213–233 | 70–148 | 14 | 6.69 | 20.8 |

[1] As determined by titration with dibutylamine.

The total weight of the isocyanate distilled over was determined to be 10.52 g. which corresponds to a yield of 68 percent of the theoretical quantity, based on the weight of the amine charged. By further distillation of the fractions above, the pure isocyanate product can be obtained.

EXAMPLE III

A 200 ml., 3-necked flask was fitted with thermometer, magnetic stirrer, dropping funnel and an electrically-heated 16 inch Vigreux column. The latter was connected to a simple head, air-condenser, adapter and receiver.

Diphenyl carbonate (107 g.) was placed in the flask and heated with stirring. At 170°–197° C., aniline (9.3 g.) was added dropwise; the column temperature was raised and distillation occurred at 240°–290° C. The distillate (33.2 g.) was shown by infrared analysis to contain the product phenyl isocyanate.

On standing at room temperature for about 9 days in the presence of the phenol formed in the reaction, the phenyl isocyanate product was converted to phenyl carbanilate which was recovered in the amount of 12.6 g. (M.P. 120°–121° C.). The yield of the phenyl isocyanate, as calculated from the amount of the phenyl carbanilate recovered, was 59.3 percent.

What is claimed is:
1. A process for the preparation of isocyanates which comprises reacting diphenyl carbonate with an amine of the formula: R—NH$_2$: wherein R is selected from the group consisting of (A) alkyl having 1 to 10 carbon atoms

(B)

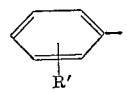

wherein R' is selected from the group consisting of hydrogen and alkyl of from 1 to 5 carbon atoms and (C) NH$_2$—(CH$_2$)$_n$—, wherein $n$ is an integer of from 4 to 10, and recovering the thus-formed isocyanate product from the reaction mixture.

2. The process of claim 1 wherein the reaction is carried out at a temperature of from about 50° C. to about 350° C.

3. The process of claim 1 wherein the said amine is aniline.

4. The process of claim 1 wherein the said amine is 2-ethylhexylamine.

5. The process of claim 1 wherein the said amine is hexamethylene diamine.

References Cited
UNITED STATES PATENTS

| | | | |
|---|---|---|---|
| 3,054,819 | 9/1962 | Barclay et al. | 260—453 |
| 3,190,905 | 6/1965 | Morshel et al. | 260—453 |
| 2,409,712 | 10/1946 | Schweitzer | 260—453 |
| 3,234,263 | 2/1966 | Kurkjy | 260—463 |

CHARLES B. PARKER, *Primary Examiner.*

D. H. TORRENCE, *Assistant Examiner.*